(12) United States Patent
Shahrbabaki et al.

(10) Patent No.: US 7,752,572 B1
(45) Date of Patent: Jul. 6, 2010

(54) METHOD OF GROUPING OBJECTS IN A GRAPHICAL USER INTERFACE

(75) Inventors: Khatoun Shahrbabaki, Leimen (DE); Hermann Burgmeier, Nussloch (DE)

(73) Assignee: SAP AG, Walldorf (DE)

( * ) Notice: Subject to any disclaimer, the term of this patent is extended or adjusted under 35 U.S.C. 154(b) by 794 days.

(21) Appl. No.: 10/731,994

(22) Filed: Dec. 9, 2003

Related U.S. Application Data

(60) Provisional application No. 60/434,071, filed on Dec. 16, 2002.

(51) Int. Cl.
*G06F 3/048* (2006.01)
(52) U.S. Cl. .............. 715/817; 715/810; 715/812; 715/825
(58) Field of Classification Search .......... 715/776, 715/777, 817, 810, 812, 825; 345/352
See application file for complete search history.

(56) References Cited

U.S. PATENT DOCUMENTS 6,177,933 B1 * 1/2001 Young ................ 715/805
6,404,443 B1 * 6/2002 Westerman ............ 715/776
6,981,223 B2 * 12/2005 Becker et al. ........... 715/753
7,017,122 B1 * 3/2006 Lee et al. ............... 715/812

* cited by examiner

*Primary Examiner*—Simon Ke
(74) *Attorney, Agent, or Firm*—Mintz, Levin, Cohn, Ferris, Glovsky & Popeo, P.C.

(57) ABSTRACT

Systems and techniques related to generating a GUI. In general, in one implementation, a GUI may be generated by grouping objects into object groups; defining an arrangement for the object groups, where each object group corresponds to at least one relationship in the arrangement; assigning a graphic pattern that is distinct for each relationship; generating a graphical structure for each object to be represented in the GUI; generating a background region for the GUI for related graphical structures associated with an object group; and, generating the GUI such that one or more related graphical structures are within the background region. In that case, each background region is based on a distinct graphic pattern for the relationship corresponding to the object group. The technique can include displaying the GUI. Also, the graphic pattern assigned to a relationship may represent a color to be displayed in a background region.

21 Claims, 4 Drawing Sheets

400

410
Group objects into object groups

420
Define an arrangement for the object groups

430
Assign graphic patterns to relationships in the arrangement

440
Generate a graphical structure for each object

450
Generate background regions based on graphic patterns

460
Generate a graphical user interface (GUI) based on the background regions and graphical structures 470
Display the GUI

FIG. 4

METHOD OF GROUPING OBJECTS IN A GRAPHICAL USER INTERFACE

CROSS REFERENCE TO RELATED APPLICATIONS

This application claims priority to U.S. provisional application Ser. No. 60/434,071, filed Dec. 16, 2002.

BACKGROUND

A graphical user interface (GUI) is the primary means for exchanging information between a user and a computing system. For example, members of an enterprise typically get most of their information from a portal, which includes a GUI as an access gateway to various information sources, and which can be graphically tailored for each user. In another example, a GUI can provide controls for the look-and-feel and functionality of applications executed by the computing system. Such controls are often provided in one or more discrete graphical windows provided in the GUI.

Information objects provided in a GUI can be grouped according to any number of arrangements. Such arrangements can be logical, hierarchical, or based on any other relationship. For instance, an "options" window for configuring a word processing application can provide a number of user-selectable boxes that are grouped by function within different areas of the window defined by lines or borders. Or, a file directory can be displayed as a "tree" showing a hierarchy of topically-related components.

SUMMARY

The graphical user interface (GUI) described here, and corresponding techniques for use, may include various combinations of the following features.

The present disclosure includes systems and techniques relating to generating a GUI. According to an aspect, a GUI may be generated by grouping objects into object groups; defining an arrangement for the object groups, where each object group corresponds to at least one relationship in the arrangement; assigning a graphic pattern that is distinct for each relationship; generating a graphical structure for each object to be represented in the GUI; generating a background region for the GUI for related graphical structures associated with an object group; and generating the GUI such that one or more related graphical structures are within the background region. In that case, each background region is based on a distinct graphic pattern for the relationship corresponding to the object group.

Implementations may include one or more of the following features. The GUI may be displayed. The graphic pattern assigned to a relationship may represent a color to be displayed in a background region. In that case, each relationship in the arrangement may be assigned a different color. Further, the different colors may be progressively lighter or darker according to the significance of the relationship in the arrangement. The graphic pattern may represent a shading pattern to be displayed in a background region. In that case, the shading pattern may include a plurality of lines. Also, the shading pattern may include a color. At least one graphical structure may be selectable by a user of the GUI for interaction. The arrangement defined for the object groups may be a hierarchy and each relationship in the hierarchy may be a level in the hierarchy.

In another aspect, a GUI may include any number of background regions displayed in the GUI and any number of graphical structures displayed in the GUI. In that case, each background region is based on a graphic pattern that is distinct and the graphic pattern may be assigned to a relationship in an arrangement of object groups. In that case, each object group includes one or more objects. Also, each graphical structure represents one of the objects and might be disposed in at least one of the background regions corresponding to the relationship of the object.

Implementations may include one or more of the following features. The graphic pattern may represent a color to be displayed in a background region. In that case, each relationship in the arrangement may be assigned a different color. Further, the different color may be progressively lighter or darker according to the significance of the relationship in the arrangement. The graphic pattern may represent a shading pattern displayed in a background region. In that case, the shading pattern may include a plurality of lines. Also, the shading pattern may include a color. Any number of graphical structures may be selectable by a user of the GUI for interaction. Each relationship in the arrangement may be a level in a hierarchy and the arrangement may be a hierarchy.

In another aspect, a GUI may be generated by grouping objects into object groups; assigning a graphic pattern that is distinct for any number of object groups; generating a graphical structure for each object to be represented in the GUI; generating a background region for the GUI for one or more related graphical structures associated with an object group; and, generating the GUI, such that one or more related graphical structures are within the background region and the GUI is configured to be modified by a user. In that case, the background region is based on the distinct graphic pattern corresponding to the object group.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 4 is a flowchart of a method for generating a graphical user interface.

Like reference numerals and designations in the drawings indicate like elements.

DETAILED DESCRIPTION

The systems and techniques described here relate to the design of a graphical user interface (GUI).

Figure 1:
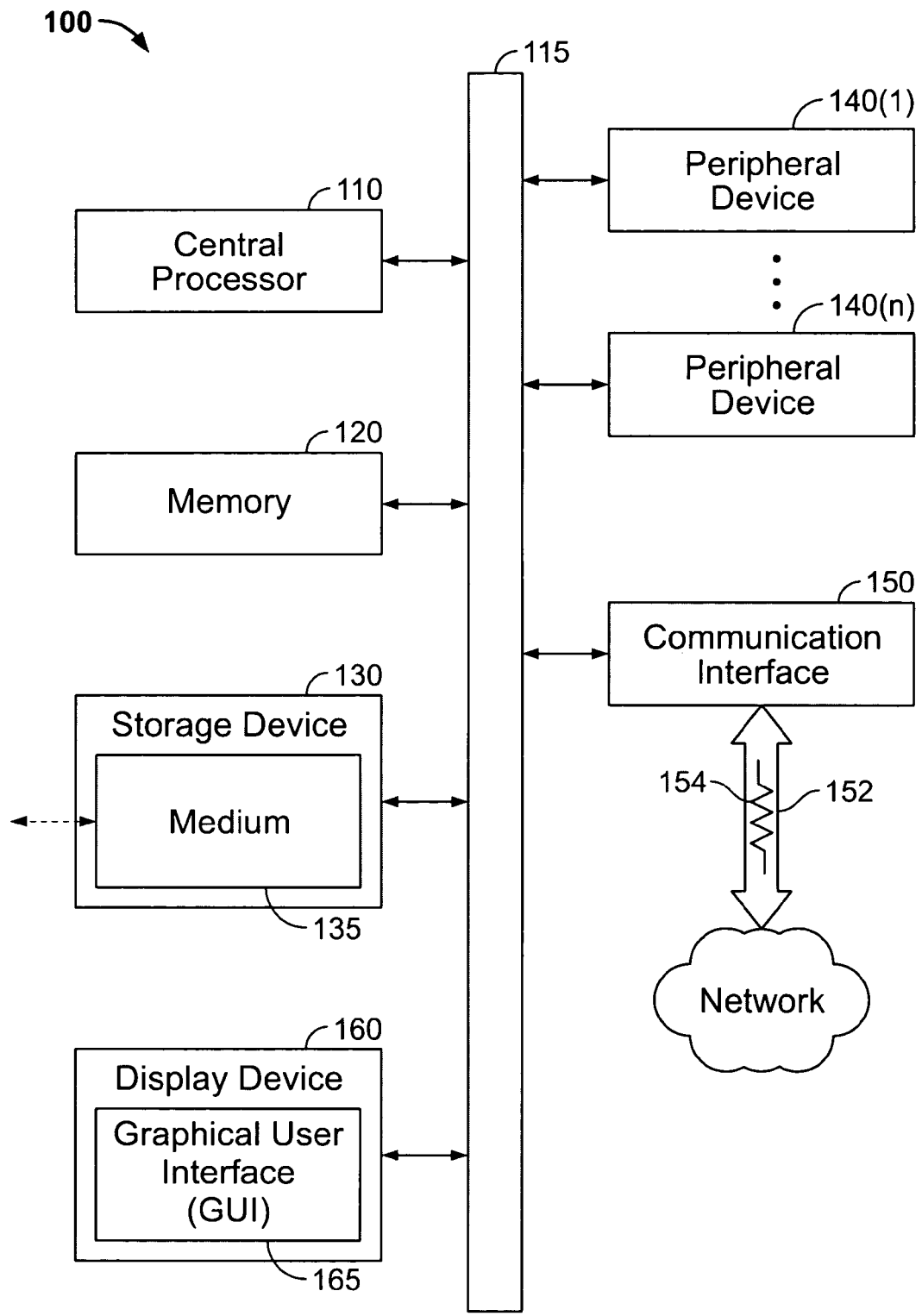
FIG. 1 is a block diagram of a computing system that may employ a graphical user interface.

FIG. 1 is a block diagram of an example computing system 100 that may employ a GUI which uses background regions to graphically represent a grouping of objects. The computing system 100 includes a central processor 110, which executes programs, performs data manipulations, and controls tasks in the computing system 100. The central processor 110 is coupled with a communications bus 115 that may include multiple busses, which may be parallel and/or serial busses.

The computing system 100 includes a memory 120, which may be volatile and/or non-volatile memory, and is coupled with the communications bus 115. The computing system 100 may also include one or more cache memories. The computing system 100 may include a storage device 130 for accessing a medium 135, which may be removable, read-only or read/write media and may be magnetic-based, optical-based, semiconductor-based media, or a combination of these. Any of the memories may store one or more data objects; for example data structures such as integers, floats, classes, and the like, which are usable by the computing system 100. The computing system 100 may also include one or more peripheral devices 140(1)-140(n) (collectively, devices 140), and one or more controllers and/or adapters for providing interface functions, such as providing a mouse interface.

The computing system 100 may also include a display device 160 for displaying images and/or text from communications bus 115 to a user. The display device may be an LCD (liquid crystal display), CRT (cathode ray tube), or other known device for displaying information to a user. The display device may display a GUI 165, which is used to interact with the computing system 100 via one of the devices 140, such as a mouse or keyboard. The GUI 165 may include graphical structures, such as text areas, text labels, text fields, windowpanes, radio buttons, checkboxes, dials, and pop-up menus. The graphical structures may be disposed in background regions to graphically represent a grouping of objects.

The computing system 100 may further include a communication interface 150, which allows software and data to be transferred, in the form of signals 154 over a channel 152, between the computing system 100 and external devices, networks, or information sources. The signals 154 may embody instructions for causing the computing system 100 to perform operations. The computing system 100 represents a programmable machine, and may include various devices such as embedded controllers, Programmable Logic Devices (PLDs), Application Specific Integrated Circuits (ASICs), and the like. Machine instructions (also known as programs, software, software applications, or code) may be stored in the computing system 100 and/or delivered to the computing system 100 over a communication interface. These instructions, when executed, enable the computing system 100 to perform the features and function described above. These instructions represent controllers of the computing system 100 and may be implemented in a high-level procedural and/or object-oriented programming language, and/or in assembly/machine language. Such languages may be compiled and/or interpreted languages.

The computing system can include clients and servers. A client and server are generally remote from each other and typically interact through a communication network. The relationship of client and server arises by virtue of computer programs running on the respective computing systems and having a client-server relationship to each other.

Figure 2:
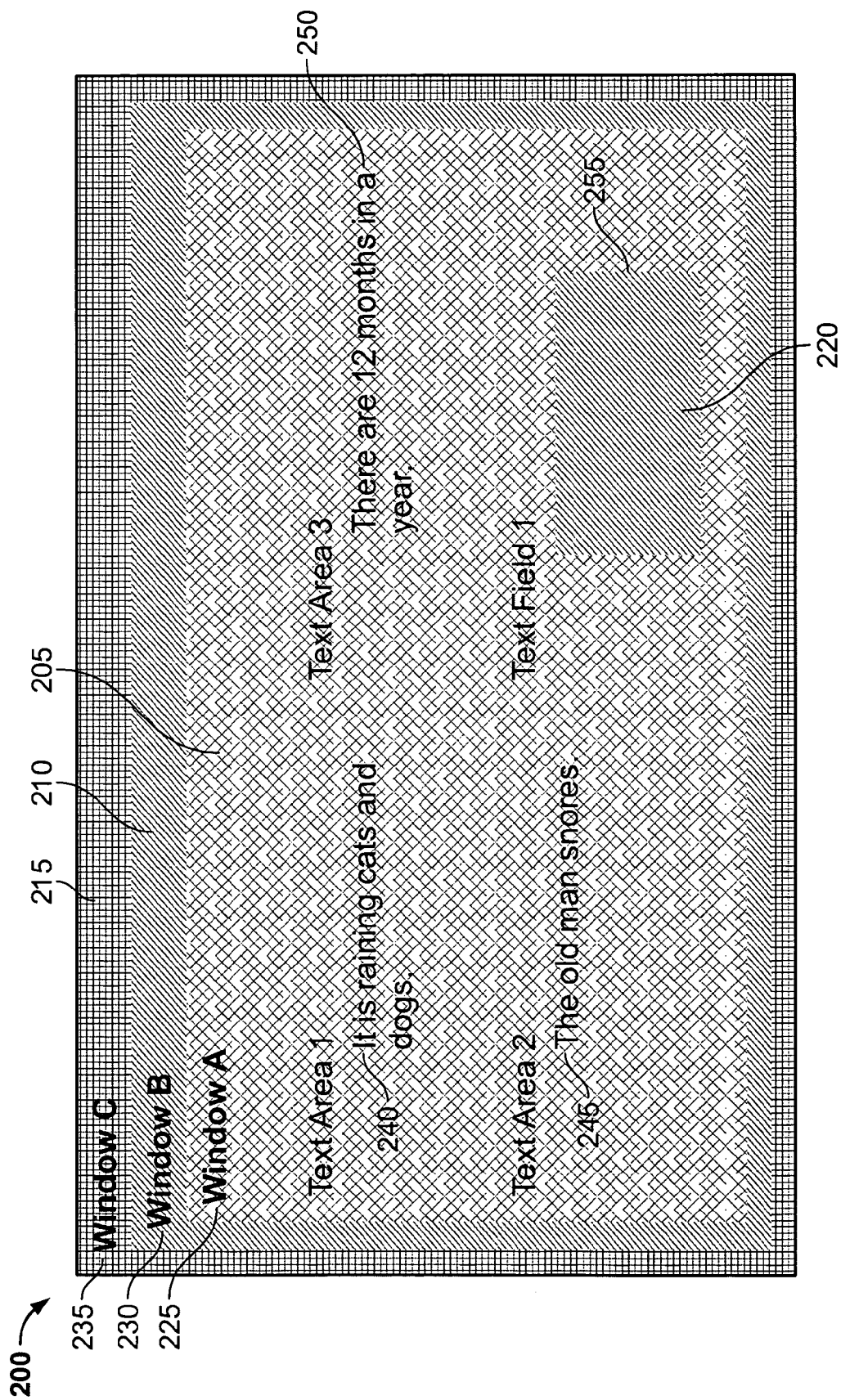
FIG. 2 is a drawing of a graphical user interface.

FIG. 2 is a drawing of a GUI 200, which displays graphically patterned background regions generated to represent a relationship among objects associated with an object group. FIG. 2 depicts four different background regions in the GUI 200 (205, 210, 215, and 220). The background regions can be based upon a graphic pattern, for example a color such as brown, with each background region based upon a graphic pattern that is distinct, such as a distinct shade of brown. Background region 210 may be based on the lightest of the four shades, and background regions 220, 205, and 215 may be based on shades of brown that go from lighter to darker, respectively. Each of these background regions corresponds to a relationship in an arrangement of object groups (not shown), such that an object group corresponds to a grouping of objects.

Alternative implementations of a similar GUI may vary. Background regions in a single GUI could be based upon colors that are not shades of the same color. For example, background regions (205, 210, and 215) in one GUI could be based on blue, green, and yellow. Also, some background regions could be based upon graphic patterns that are not solid colors. For example, the background patterns could be based upon patterned quadratic lines, curved lines, circular shapes, logo images, etc.

The GUI 200 may include a number of graphical structures, such as windowpanes (225, 230, and 235), text areas (240, 245, and 250), and text fields (255). Each graphical structure may represent an object (not shown). For example, the text area 240 could represent a weather object. Also, a graphical structure can be interactive, such that a user can use an input device to interact with the graphical structure, or non-interactive, such that the graphical structure is merely informative. An interactive graphical structure may include a text field (255). A non-interactive graphical structure may include a text area (240). Alternatively, any combination of different graphical structures can be used to represent an object, including text areas, text labels, text fields, windowpanes, radio buttons, checkboxes, dials, and pop-up menus.

In FIG. 2, any number of graphical structures may be disposed in background regions corresponding to the relationships of the objects. Graphical structures with a similar relationship corresponding to their objects may be disposed in the same background region, or graphical structures with different relationships corresponding to their objects may be disposed in diverse background regions. For example, graphical structures 220, 240, 245, 250, and 255 are disposed in the background region 205. If a hierarchy were the arrangement used to generate FIG. 2, the graphical structures may be disposed in background region 205 because background region 205 corresponds to the same level in a hierarchy. Likewise, other graphical structures in FIG. 2 may be disposed in a background region corresponding to the same relationships among objects, such as windowpane 225 and non-visible graphical structures disposed in background region 210, the windowpane 230 and non-visible graphical structures disposed in background region 215, and the text field 255 disposed in background region 220.

In contrast, for example (not shown), each of the text areas 240, 245, and 250 may be disposed in diverse background regions corresponding to different relationships of the objects. For example (not shown), if the arrangement used to generate FIG. 2 were a hierarchy, text areas 245 and 250 might be in the same object group in the hierarchy and text area 240 may correspond to a higher level in the hierarchy than text areas 245 and 250. Thus, text areas 245 and 250 might be disposed in a common background region to reflect that they correspond to objects in the same object group. Also, text areas 245 and 250 may be based on a graphic pattern that is distinct from the graphic pattern used for the background region of text area 240, to reflect that they have different relationships. In addition, the common background region of text areas 245 and 250 might be encompassed by the background region corresponding to text area 240 to reflect that 240 corresponds to a higher level in the hierarchy. However, if objects corresponding to text areas 245 and 250 were not grouped in the same object group, the text areas would not be disposed in a common background region. Rather, 245 and 250 might each have a separate background region corresponding to the same level in the hierarchy. The background regions might appear separately in a GUI as two rectangles separated by a gap to reflect that there are two separate object groups.

Figure 3:
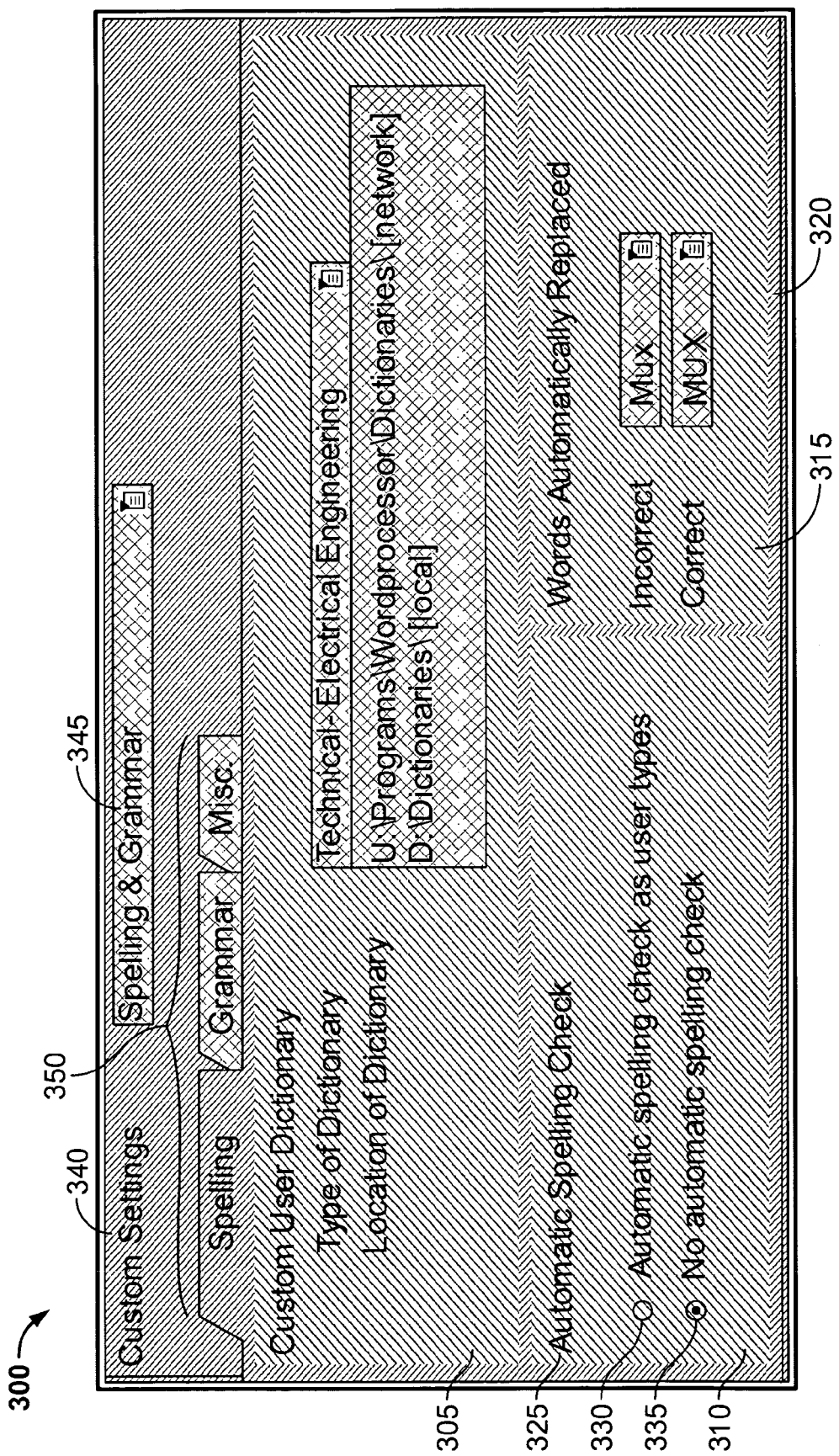
FIG. 3 is a drawing of a graphical user interface.

FIG. 3 is a drawing of a GUI 300 implementing graphically patterned background regions to represent relationships of object groups. The GUI may represent a "custom settings" dialog box that may appear in a word processor application program, for instance. GUI 300 may include several background regions, including background regions 305, 310, 315, and 320. The background regions 305, 310, and 315 can be based on a light shade of brown that is distinct from the dark shade of brown from which background region 320 may be based. In GUI 300, the light shade of brown can correspond to a different relationship in an arrangement, such as a different level in a hierarchy, than the relationship corresponding to the dark shade of brown.

The object groups in the arrangement corresponding to GUI 300 each include at least one object (not shown) that is represented by a graphical structure. For example, the object group corresponding to background region 310 may have an object "group label" represented by the text label 325, an object "automatic spelling" represented by the radio button 330, and an object "no automatic spelling" represented by the radio button 335. All of the graphical structures, 325, 330, and 335, may be disposed in a background region 310, which may correspond to their relationship in the arrangement.

FIG. 3 illustrates another GUI 300, showing that many types of graphical structures can use diverse background regions to depict different types of relationships in an arrangement. For example, in GUI 300, pop-up menus and windowpanes may have diverse background regions to depict relationships, such as dependencies in a hierarchy. Windowpane 340 may represent an object group for custom settings and may have a light brown background region 320. Pop-up menu 345 may represent an object group for types of custom settings and may have a dark brown background region. The contrast of a dark brown and a light brown background region may be used to show that the object groups corresponding to 345 are dependent upon the object groups corresponding to 320. Thus, the types of settings object group may depend on the settings object group. Another example of a set of graphical structures that may have diverse background regions to show different relationships, such as dependencies in a hierarchy, is the set of tabs 350 and background regions 305, 310, and 315. The set of tabs may have a background region based on a graphic pattern distinct from the background regions 305, 310, and 315 to show the graphical structures correspond to object groups having different relationships. Alternatively, many types of graphical structures can be used with background regions to show different relationships.

FIG. 4 is a flowchart 400 of a method for generating a GUI that may use background regions to represent relationships of grouped objects. At 410, objects are grouped into objects. For example (not shown), a group of three objects, one for time, one for date, one for weather, may be grouped into an object group known as object group A. A separate object representing astrology may be grouped into a different object group B. A third object group, object group C, may include other information such as news.

At 420, an arrangement is defined for the object groups. Following the previous example, a type of arrangement such as a hierarchy may be chosen. In the arrangement, each object group will be assigned a relationship. For example, if the arrangement is a hierarchy, object group C may be assigned to one level in the hierarchy. Likewise, groups A and B may be assigned to other or same levels in the hierarchy. The level in the hierarchy of groups A and B may be lower than the level in the hierarchy corresponding to group C. Further, the arrangement may have relationships such that, there are two levels in the hierarchy, one level for group C and one level for groups A and B.

Alternative methods may use multiple arrangements or other types of arrangements. For example, if there are multiple arrangements, group C and group A may be in one arrangement while group B is in a separate arrangement. Other types of arrangements may include logical arrangements. Logical arrangements may include different types of hierarchies, such as binary trees, cone trees, or other types of structures; different types of groupings; different types of mappings; etc. Also, the arrangements may have different types of relationships, such as overlapping, disjoint, one to one, n to one, etc. In addition, the types of relationships and arrangements may be any combination of the above or other known types.

At 430, a graphic pattern is assigned to the relationships. Following the same example, the relationships corresponding to groups A and B may be assigned a graphic pattern, such as a solid color, for example, orange. A graphic pattern distinct from orange, such as yellow, may be assigned to the relationship corresponding to group C. In other alternatives, patterns may be chosen to reflect differences among the relationships. For example, the color red may be used such that each relationship is assigned a distinct shade of red. To represent the significance of the relationships some relationships may have a darker or lighter shade of red than other relationships. For example, to represent dependencies in a hierarchy, lower levels in the hierarchy may be assigned a darker shade of red than higher levels in the hierarchy. Thus, in an alternative of the present example, the relationship corresponding to group C may be assigned a light, pinkish red while the relationship corresponding to groups A and B may be assigned a dark, merlot red to reflect the relationships, such as a dependency between group C and groups A and B.

At 440, a graphical structure is generated for each object. Following the original example, a graphically represented analog clock may be generated for the time object; text areas may be generated for the date, weather, and astrology objects; and, a text label may be generated for the news object.

At 450, background regions are generated based upon the assigned graphic patterns. Following the original example, a background region may be generated for each object group such that a background region is generated for object group A based on the color yellow, a background region is generated for object group B based on the color yellow, and a background region is generated for object group C based on the color red. The background regions may be rectangles, similar to background region 205, or the background regions may be any other polygonal shapes, such as triangles, hexagons, or octagons. Alternatively, the background regions may be non-polygonal closed figures, such as circles.

At 460, a GUI is generated based on the background regions and graphical structures. The GUI can be a combination of the graphical structures and corresponding background regions. Each graphical structure should be disposed in its corresponding background region. Graphical structures of the same object group may have a common background region, or may be disposed in separate but identical background regions. Following the example, all the graphical structures corresponding to group A, the clock and text areas, may be disposed in a common rectangular background region based on the color orange. The text area corresponding to group B may be disposed in a separate rectangular background region based on the color orange. And, the text label corresponding to group C may be disposed in a separate rectangular background region based on the color yellow. To show relationships, such as dependencies in a hierarchy, the background region corresponding to group C may encompass the background regions corresponding to group A and group B.

Optionally, the GUI may be displayed (470). This may involve the use of a video card adapter receiving information related to the GUI and rendering the information to a monitor or other display device. Alternatively, a CPU or an other processor may render the GUI to any output device.

Although the method of generating a GUI is shown in FIG. 4 as being composed of seven different processes, additional and/or different processes can be used instead. Similarly, the processes for generating a GUI need not be performed in the order depicted. Thus, although a few embodiments have been described in detail above, other modifications are possible. Other embodiments may be within the scope of the following claims.

The invention claimed is:

1. A method comprising:
    grouping graphical user interface objects into object groups;
    defining an arrangement for a plurality of the object groups, each object group corresponding to at least one relationship in the arrangement, the arrangement corresponding to a hierarchy among the object groups to provide the at least one relationship, the at least one relationship comprising at least one of an overlapping relationship, a disjoint relationship, a one-to-one relationship, and an n-to-one relationship;
    assigning a graphic pattern to each of the at least one relationship, the graphic pattern assigned to each relationship being distinct from the graphic patterns assigned to each other relationship in the arrangement;
    defining a graphical structure for each object;
    defining a background region for each object group based on the graphic pattern assigned to the at least one relationship corresponding to the object group; and
    generating the graphical user interface, the graphical user interface comprising:
        a first two of the background regions that are concurrently displayed in the graphical user interface and that do not overlap with each other, each of the first two of the background regions comprising one or more graphical structures representing related objects; and
        a second two of the background regions that are concurrently displayed in the graphical user interface and that do overlap with each other, each of the second two of the background regions lacking a border that comprises a distinct graphical pattern differing from the graphic pattern assigned to the background region, such that a visual transition between the overlapping background regions is defined by a change between the graphic patterns assigned to each of the second two of the background regions.

2. The method in accordance with claim 1, further comprising displaying the GUI.

3. The method in accordance with claim 1, wherein at least one a graphic pattern represents a color to be displayed in one of the background regions.

4. The method in accordance with claim 3, wherein each relationship in the arrangement is assigned a different color.

5. The method in accordance with claim 4, wherein the different color is progressively lighter or darker according to the significance of the relationship in the arrangement.

6. The method in accordance with claim 1, wherein at least one graphic pattern represents a shading pattern to be displayed in one of the background regions.

7. The method in accordance with claim 6, wherein the shading pattern includes a plurality of lines.

8. The method in accordance with claim 6, wherein the shading pattern includes a color.

9. The method in accordance with claim 1, wherein at least one graphical structure is selectable by a user of the GUI for interaction.

10. The method in accordance with claim 1, wherein each relationship in the hierarchy is a level in the hierarchy.

11. The method in accordance with claim 1, wherein the graphic patterns of the first two of the background regions are related to denote the relationship between the first two of the background regions in the hierarchy.

12. An apparatus comprising:
    at least one processor and a memory configured to provide a method comprising:
    grouping graphical user interface objects into object groups;
    defining an arrangement for a plurality of the object groups, each object group corresponding to at least one relationship in the arrangement, the arrangement corresponding to a hierarchy among the object groups to provide the at least one relationship, the at least one relationship comprising at least one of an overlapping relationship, a disjoint relationship, a one-to-one relationship, and an n-to-one relationship;
    assigning a graphic pattern to each of the at least one relationship, the graphic pattern assigned to each relationship being distinct from the graphic patterns assigned to each other relationship in the arrangement;
    defining a graphical structure for each object;
    defining a background region for each object group based on the graphic pattern assigned to the at least one relationship corresponding to for the object group; and
    generating the graphical user interface, the graphical user interface comprising:
        a first two of the background regions that are concurrently displayed in the graphical user interface and that do not overlap with each other, each of the first two of the background regions comprising one or more graphical structures representing related objects; and
        a second two of the background regions that are concurrently displayed in the graphical user interface and that do overlap with each other, each of the second two of the background regions lacking a border that comprises a distinct graphical pattern differing from the graphic pattern assigned to the background region, such that a visual transition between the overlapping background regions is defined by a change between the graphic patterns assigned to each of the second two of the background regions.

13. The apparatus in accordance with claim 12, wherein at least one graphic pattern represents a color to be displayed in one of the background regions.

14. The apparatus in accordance with claim 13, wherein each relationship in the arrangement is assigned a different color.

15. The apparatus in accordance with claim 14, wherein the different color is progressively lighter or darker according to the significance of the relationship in the arrangement.

16. The apparatus in accordance with claim 12, wherein at least one graphic pattern represents a shading pattern displayed in one of the background regions.

17. The apparatus in accordance with claim 16, wherein the shading pattern includes a plurality of lines.

18. The apparatus in accordance with claim 16, wherein the shading pattern includes a color.

19. The apparatus in accordance with claim 12, wherein at least one graphical structure is selectable by a user of the GUI for interaction.

20. The apparatus in accordance with claim 12, wherein each relationship in the arrangement is a level in the hierarchy.

21. A computer program product, tangibly embodied on a computer-readable storage medium, the computer program product comprising instructions that, when executed by a processor, cause the processor to perform operations comprising:

grouping a set of data objects into a plurality of object groups that comprises a first object group, a second object group, and a third object group;

defining a hierarchical arrangement for the plurality of object groups, the hierarchical arrangement comprising defined relationships between the first object group, the second object group, and the third object group and a plurality of levels to which the data objects in the set of data objects are assigned, the defined relationships comprising at least one of an overlapping relationship, a disjoint relationship, a one-to-one relationship, and an n-to-one relationship;

assigning graphic patterns to each of the defined relationships, the graphic patterns reflecting levels in the hierarchy;

generating a graphical structure for each data object in the set of data objects;

generating a plurality of background regions, each of the background regions having one of the graphic patterns to correspond to one of the levels of the hierarchy;

generating a graphical user interface that comprises the graphical structures and the background regions with the graphical structures arranged in the background regions to reflect the levels of the hierarchy to which the data objects belong and the object group of the plurality of object groups that comprises each data object.

* * * * *